United States Patent
Yamagishi

(10) Patent No.: US 8,243,431 B2
(45) Date of Patent: Aug. 14, 2012

(54) ELECTRONIC DEVICE

(75) Inventor: Takuma Yamagishi, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 152 days.

(21) Appl. No.: 12/881,055

(22) Filed: Sep. 13, 2010

(65) Prior Publication Data

US 2011/0128682 A1 Jun. 2, 2011

(30) Foreign Application Priority Data

Nov. 30, 2009 (JP) ................................ 2009-271347

(51) Int. Cl.
*H05K 5/00* (2006.01)
*H05K 7/00* (2006.01)

(52) U.S. Cl. ......... 361/679.27; 361/679.21; 361/679.26; 361/679.28

(58) Field of Classification Search ............. 361/679.21, 361/679.27, 679.28, 679.26
See application file for complete search history.

(56) References Cited

U.S. PATENT DOCUMENTS

| | | | |
|---|---|---|---|
| 6,751,090 B1 * | 6/2004 | Yang ...................... | 361/679.06 |
| 6,912,122 B2 * | 6/2005 | Chen et al. ............... | 361/679.27 |
| 7,100,876 B2 * | 9/2006 | Tseng et al. ............... | 248/125.9 |
| 7,308,733 B2 * | 12/2007 | An et al. ...................... | 16/367 |
| 7,499,737 B2 | 3/2009 | Mizuta et al. | |
| 7,916,462 B2 * | 3/2011 | Hung ....................... | 361/679.27 |
| 2010/0188350 A1 | 7/2010 | Sawada | |

FOREIGN PATENT DOCUMENTS

| | | |
|---|---|---|
| JP | 2005-114033 A | 4/2005 |
| JP | 2006-211690 A | 8/2006 |
| JP | 2008-015712 | 1/2008 |
| JP | 2008-153599 A | 7/2008 |
| JP | 2009-071588 | 4/2009 |

OTHER PUBLICATIONS

Notice of Rejection mailed by the Japan Patent Office on Nov. 30, 2010 in corresponding Japanese patent app. No. 2009-271347 in 3 pages.
Notice of Rejection mailed by the Japan Patent Office on Aug. 16, 2011 in corresponding Japanese patent app. No. 2009-271347 in 4 pages.

* cited by examiner

*Primary Examiner* — Anthony Haughton
(74) *Attorney, Agent, or Firm* — Knobbe, Martens, Olson & Bear, LLP

(57) ABSTRACT

According to one embodiment, an electronic device includes a first body, a second body, a hinge mechanism, and a contact portion. The hinge mechanism connects the first body and the second body such that the first body and the second body can relatively rotate about a rotation axis and relatively move in a direction along the rotation axis. In the contact portion, the housing of the first body and the housing of the second body are in contact with each other while the first body and the second body are relatively rotating about the rotation axis to guide one of the first body and the second body to move spirally about the rotation axis relative to another one of the first body and the second body.

9 Claims, 8 Drawing Sheets

ELECTRONIC DEVICE

CROSS-REFERENCE TO RELATED APPLICATIONS

This application is based upon and claims the benefit of priority from Japanese Patent Application No. 2009-271347, filed on Nov. 30, 2009, the entire contents of which are incorporated herein by reference.

FIELD

Embodiments described herein relate generally to an electronic device.

BACKGROUND

Folding electronic devices have been used as notebook personal computers, personal digital assistants (PDAs), smartphones, personal computers, and the like. Such a folding electronic device includes two housings that are connected such that they are relatively slidable along their front or back surfaces. For example, Japanese Patent Application Publication (KOKAI) No. 2008-153599 discloses a conventional electronic device having a hinge mechanism that allows two housings to be relatively movable in the thickness direction when they are relatively slid. When the housings are in the open position, their surfaces are flat or at the same level.

The hinge mechanism of the conventional electronic device has a complicated structure, and may cause an increase in size, weight, manufacturing costs, and the like of the electronic device. Further, the hinge mechanism is not suitable for a rotational slide system.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
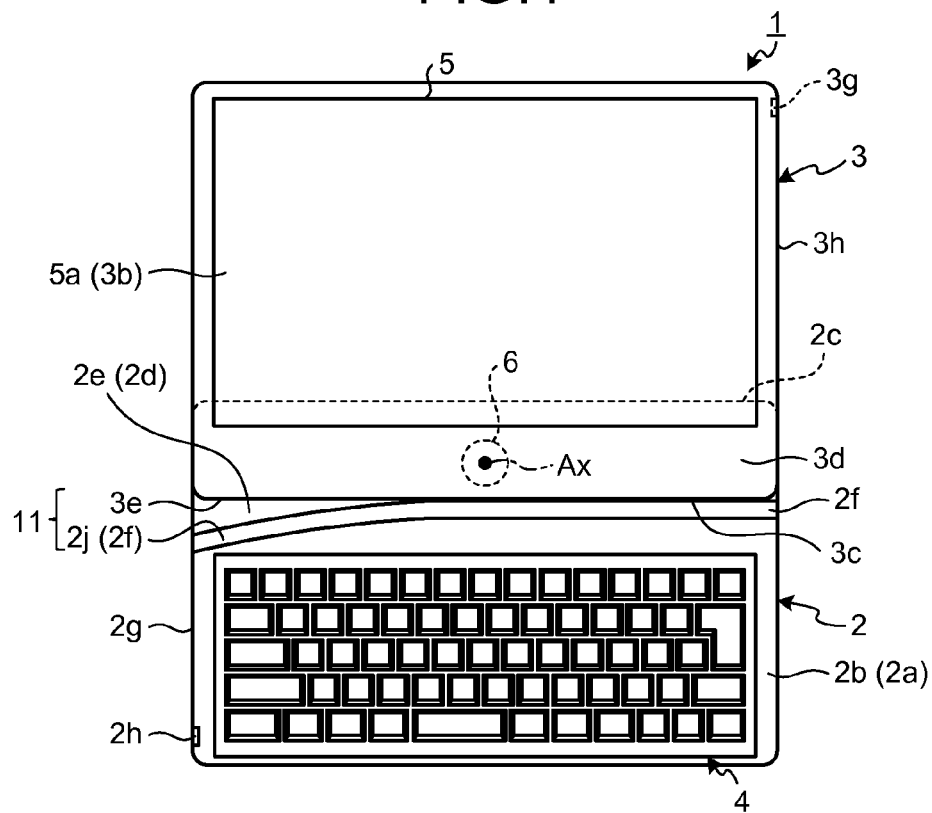
FIG. 1 is an exemplary plan view of an electronic device in open mode according to an embodiment.
Figure 2:
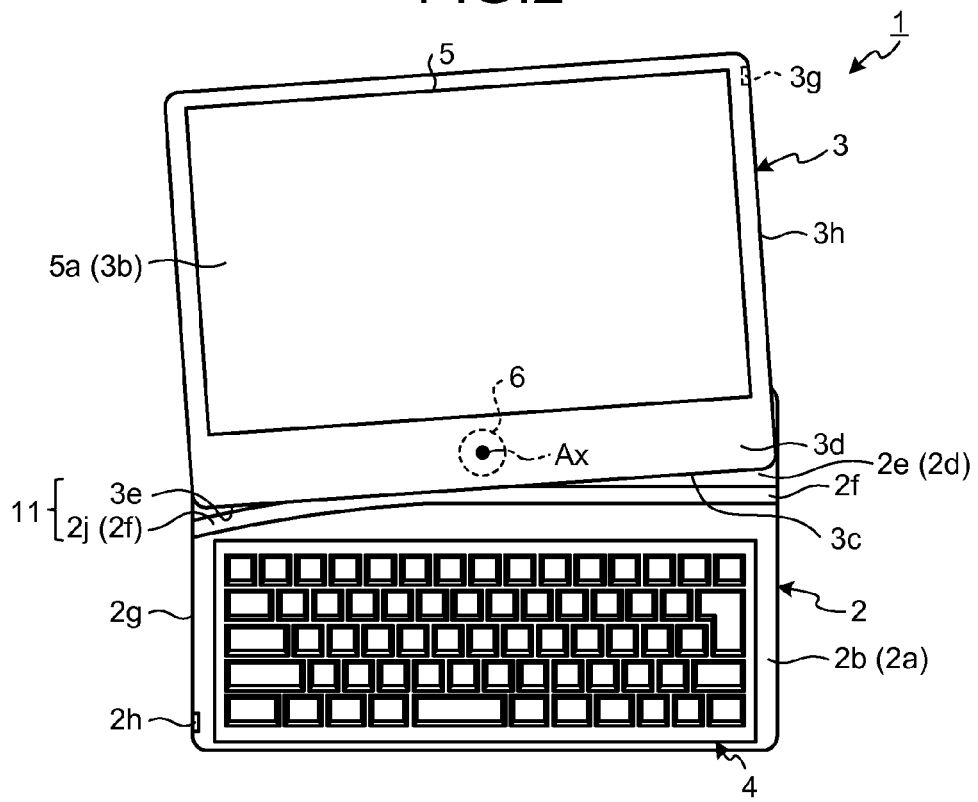
FIG. 2 is an exemplary plan view of the electronic device a second housing of which is being rotationally slid with respect to a first housing from the open mode to closed mode in the embodiment.
Figure 3:
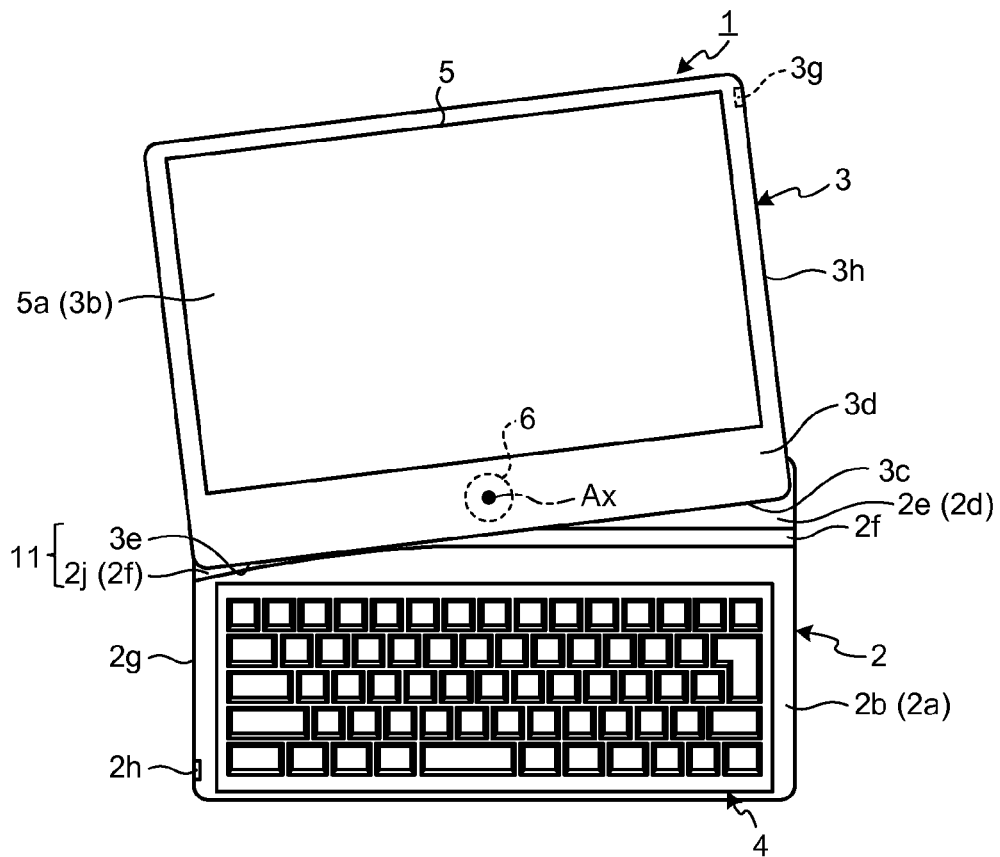
FIG. 3 is an exemplary plan view of the electronic device the second housing of which is being further rotationally slid with respect to the first housing from the open mode to the closed mode in the embodiment.

In general, according to one embodiment, an electronic device comprises a first body, a second body, a hinge mechanism, and a contact portion. The hinge mechanism is configured to connect the first body and the second body such that the first body and the second body can relatively rotate about a rotation axis and relatively move in a direction along the rotation axis. In the contact portion, the housing of the first body and the housing of the second body are in contact with each other while the first body and the second body are relatively rotating about the rotation axis to guide one of the first body and the second body to move spirally about the rotation axis relative to another one of the first body and the second body.

According to another embodiment, an electronic device comprises a first body, a second body, and a hinge mechanism. The hinge mechanism is configured to connect the first body and the second body such that the first body and the second body can relatively rotate about a rotation axis and relatively move in a direction along the rotation axis.

With reference to FIGS. 1 to 8, a description will be given of the entire structure of an electronic device 1 according to an embodiment. The electronic device 1 comprises a first body 2 and a second body 3. The first body 2 and the second body 3 are of a flat rectangular shape in a plan view (in the direction perpendicular to the plane of FIGS. 1 to 4).

The first body 2 comprises a housing 2a that houses a circuit board and the like. The circuit board is mounted with a central processing unit (CPU), a read only memory (ROM), a random access memory (RAM), a hard disk, and other electronic components (all not illustrated). The first body 2 is provided with a keyboard 4 as an input device configured to be exposed on a front surface 2b of the first body 2.

On the other hand, the second body 3 is provided with a display device 5 such as a liquid crystal display (LCD) panel configured to be exposed on a front surface 3b of the second body 3. The display device 5 may be a touch panel through which the user can provide input by touching it with his/her finger or a stylus pen.

Figure 4:
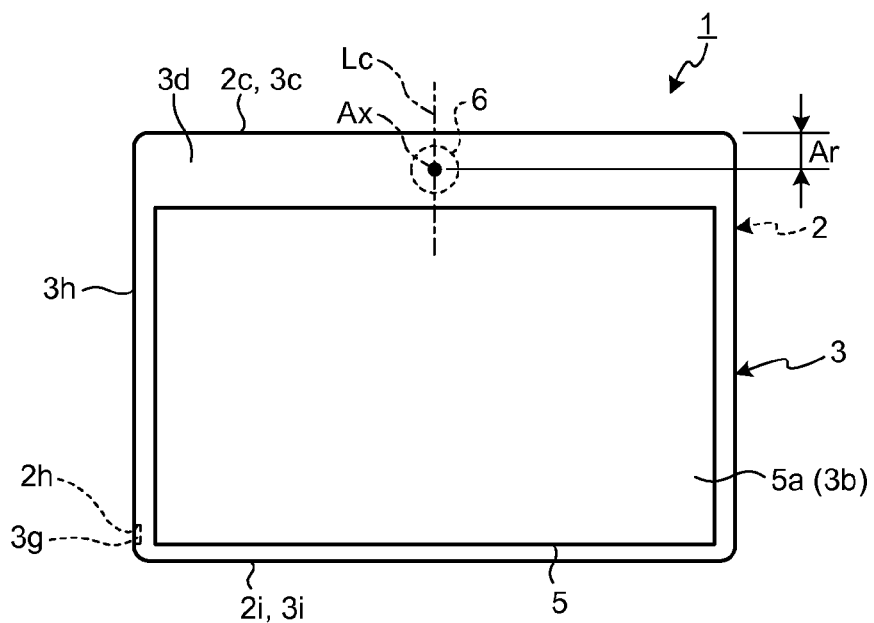
FIG. 4 is an exemplary plan view of the electronic device in the closed mode in the embodiment.

The first body 2 and the second body 3 are connected by a hinge mechanism 6. The hinge mechanism 6 allows the first body 2 and the second body 3 to relatively rotate about a rotation axis Ax extending in the thickness direction of the first body 2 or the second body 3 (in the direction perpendicular to the plane of FIGS. 1 to 4, a direction indicated by an arrow Dt in FIGS. 5 to 8). That is, in the embodiment, the second body 3 is rotated on the rotation axis Ax by 180° (deg) with respect to the first body 2 as illustrated in FIGS. 1 to 4 to switch the electronic device 1 between open mode as illustrated in FIG. 1 (and FIG. 5) and closed or folded mode as illustrated in FIG. 4 (and FIG. 8). Further, in the embodiment, as can be seen in FIGS. 5 to 8, between the open mode illustrated in FIG. 5 and the closed mode illustrated in FIG. 8, the first body 2 and the second body 3 relatively move along the direction of the rotation axis Ax (i.e., the thickness direction, the direction indicated by the arrow Dt in FIGS. 5 to 8). A specific structure of the hinge mechanism 6 related to this movement will be described later.

Figure 5:
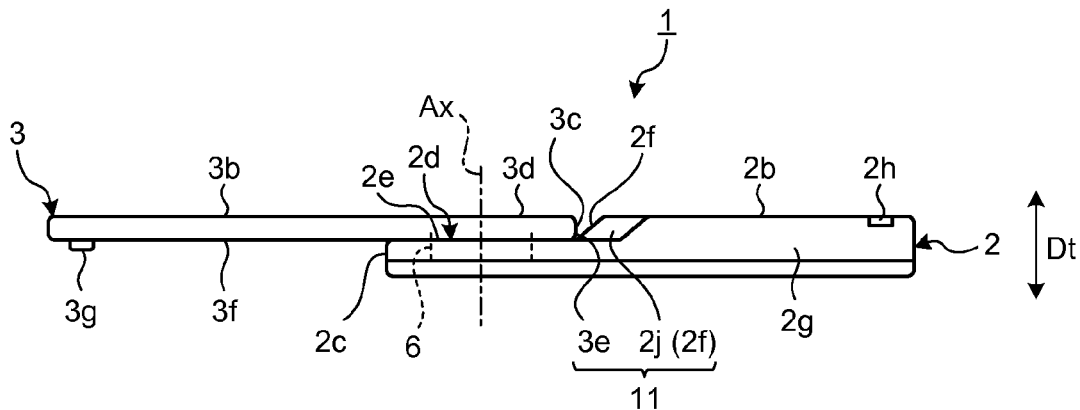
FIG. 5 is an exemplary side view of the electronic device illustrated in FIG. 1 in the embodiment.

In the open mode, as illustrated in FIGS. 1 and 5, the first body 2 and the second body 3 extend in a direction along their front surfaces 2b and 3b. Compared to the closed mode illustrated in FIGS. 4 and 8, the projected area is larger in a plan view. In this mode, the front surface 2b of the first body 2 and the keyboard 4 are exposed. As illustrated in FIGS. 1, 5, and the like, a recess 2d is formed on the front surface 2b of the first body 2. The recess 2d extends in a band-like shape along a side 2c (in the embodiment, a long side of the rectangle). As illustrated in FIGS. 5 to 8, the recess 2d has a substantially constant depth from the front surface 2b, and a bottom surface 2e of the recess 2d is one level lower than the front surface 2b. As illustrated in FIG. 5, in the open mode, an edge 3d extending along a side 3c (in the embodiment, a long side of the rectangle) of the second body 3 in a plan view is fitted in the recess 2d. Thus, the front surface 2b of the first body 2 and the front surface 3b of the second body 3 are laid flat side by side with almost no step.

Figure 8:
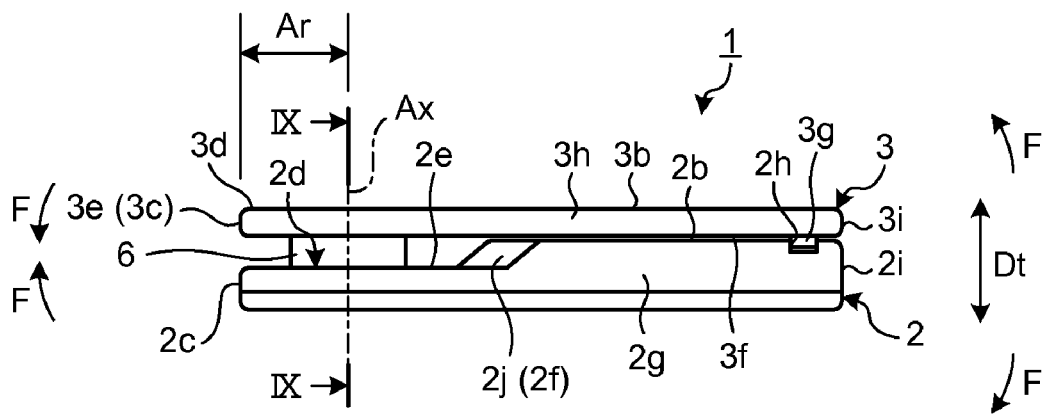
FIG. 8 is an exemplary side view of the electronic device illustrated in FIG. 4 in the embodiment.

In the closed mode, as illustrated in FIGS. 4 and 8, the first body 2 and the second body 3 overlap in the thickness direction. Accordingly, the entire thickness increases compared to that in the open mode illustrated in FIGS. 1 and 5. In this mode, as illustrated in FIG. 8, the front surface 2b of the first body 2 faces a back surface 3f of the second body 3 in contact therewith or slightly spaced therefrom.

As illustrated in FIG. 4, the rotation axis Ax of the hinge mechanism 6 is provided on a center line Lc passing through the center point of the side 2c of the first body 2 perpendicularly to the side 2c. This prevents the first body 2 and the second body 3 from being displaced in a direction along the side 2c.

In the embodiment, the relative rotation of the first body 2 and the second body 3 about the rotation axis Ax is restricted within a predetermined range. More specifically, in the open mode illustrated in FIG. 1, the second body 3 can rotate only counterclockwise and cannot rotate clockwise in FIG. 1 with respect to the first body 2. On the other hand, in the closed mode illustrated in FIG. 4, the second body 3 can rotate only clockwise and cannot rotate counterclockwise in FIG. 4 with respect to the first body 2. The restriction on the relative rotation range can be realized by the engagement of the housing 2a of the first body 2 and a housing 3a of the second body 3. For example, in the open mode illustrated in FIGS. 1 and 2, a side surface 2f of the recess 2d formed in the first body 2 is engaged with a side surface 3e of the edge 3d of the second body 3 fitted in the recess 2d. With this, the second body 3 is restricted from rotating clockwise from the position of FIG. 1 with respect to the first body 2. That is, the side surfaces 2f and 3e serve as stoppers that restrict the relative rotation of the first body 2 and the second body 3. Meanwhile, in the closed mode illustrated in FIGS. 4 and 8, a side surface 2g of the first body 2 is engaged with a protrusion 3g provided on the back surface 3f of the second body 3. With this, the second body 3 is restricted from rotating counterclockwise from the position of FIG. 4 with respect to the first body 2. That is, the protrusion 3g also serves as a stopper that restricts the relative rotation of the first body 2 and the second body 3. The protrusion 3g is located near a side surface 3h (see FIG. 1) of the second body 3 not to interfere the first body 2 in the relative rotation of the second body 3 with respect to the first body 2. A recess 2h is formed in the side surface 2g of the first body 2 to receive the protrusion 3g. Besides, the protrusion 3g is formed into a hook so that the tip of the protrusion 3g is engaged with the housing 2a of the first body 2 in the thickness direction (the direction indicated by the arrow Dt). This prevents the first body 2 and the second body 3 from being separated in the thickness direction.

Figure 9:
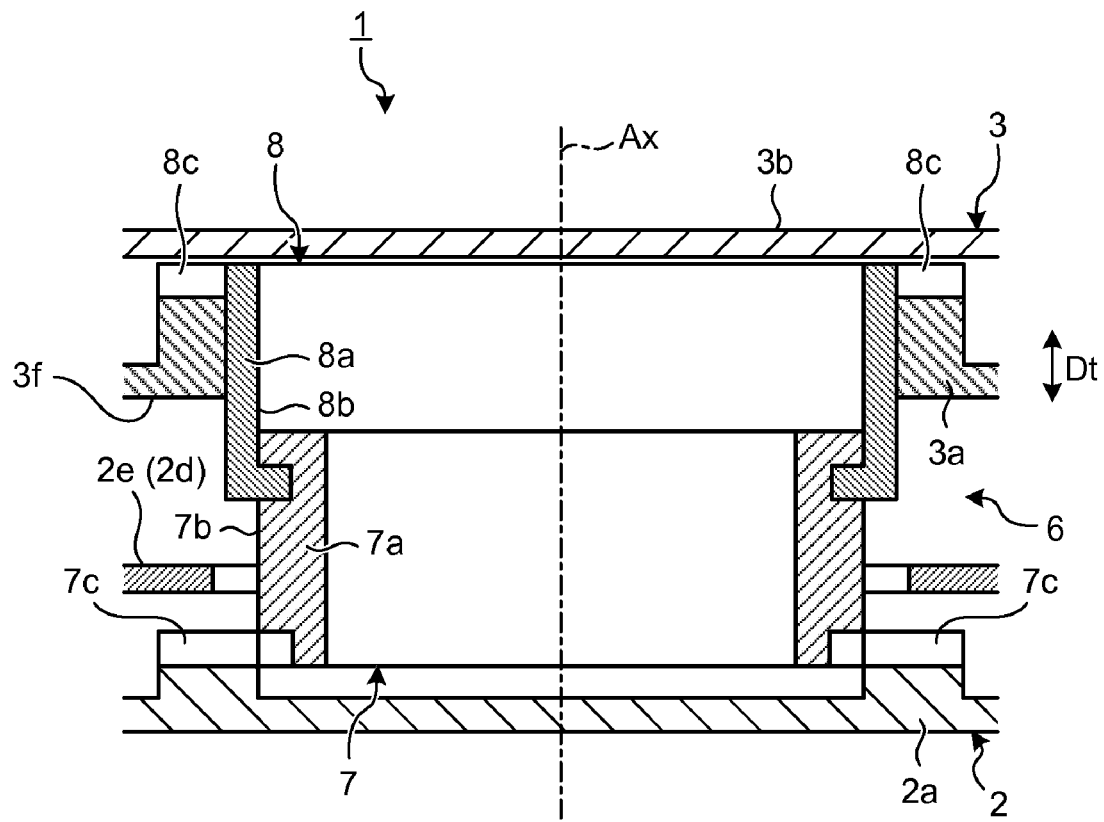
FIG. 9 is an exemplary cross-sectional view taken along line IX-IX of FIG. 8 in the embodiment.
Figure 10:
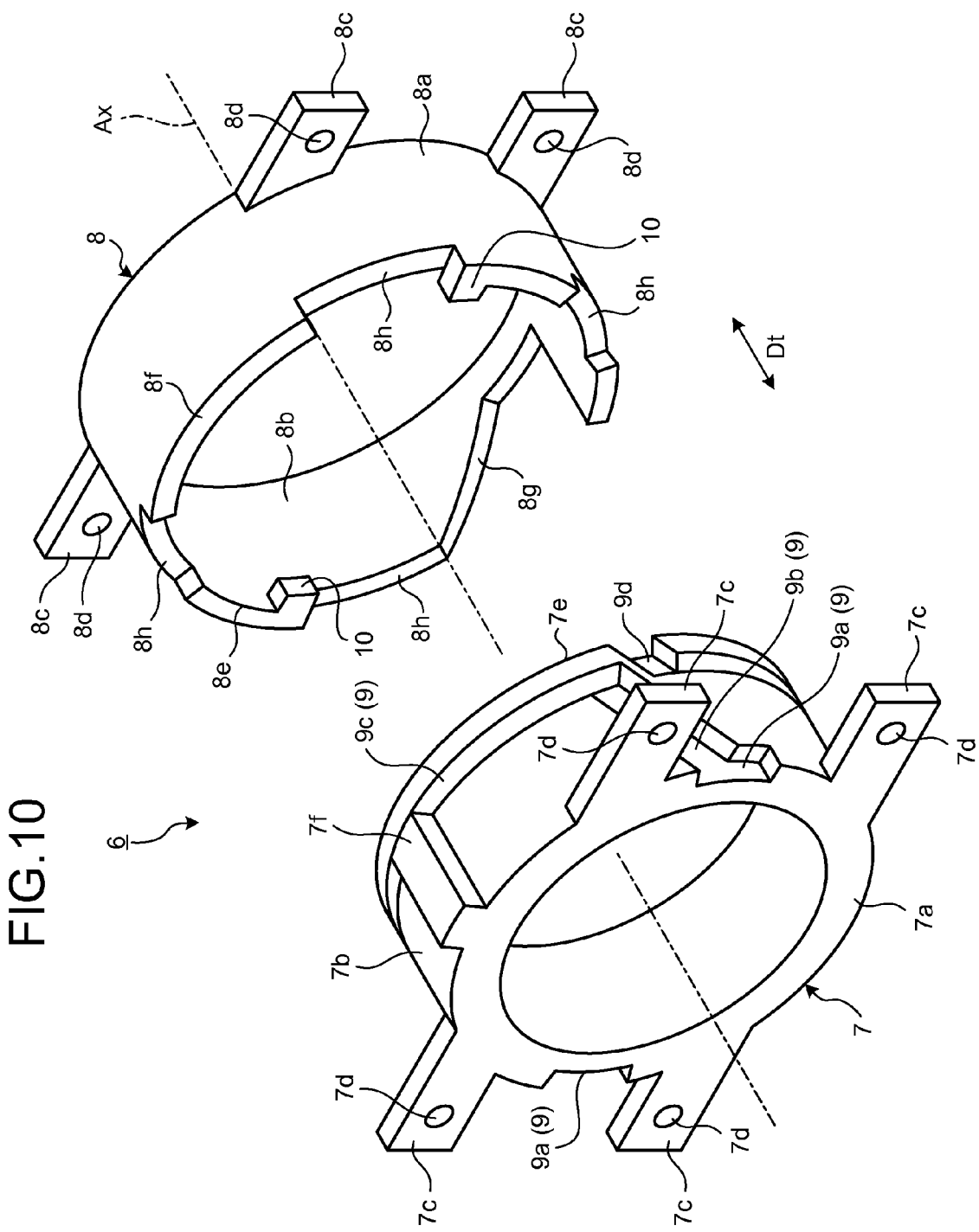
FIG. 10 is an exemplary exploded perspective view of a hinge mechanism in the embodiment.
Figure 11:
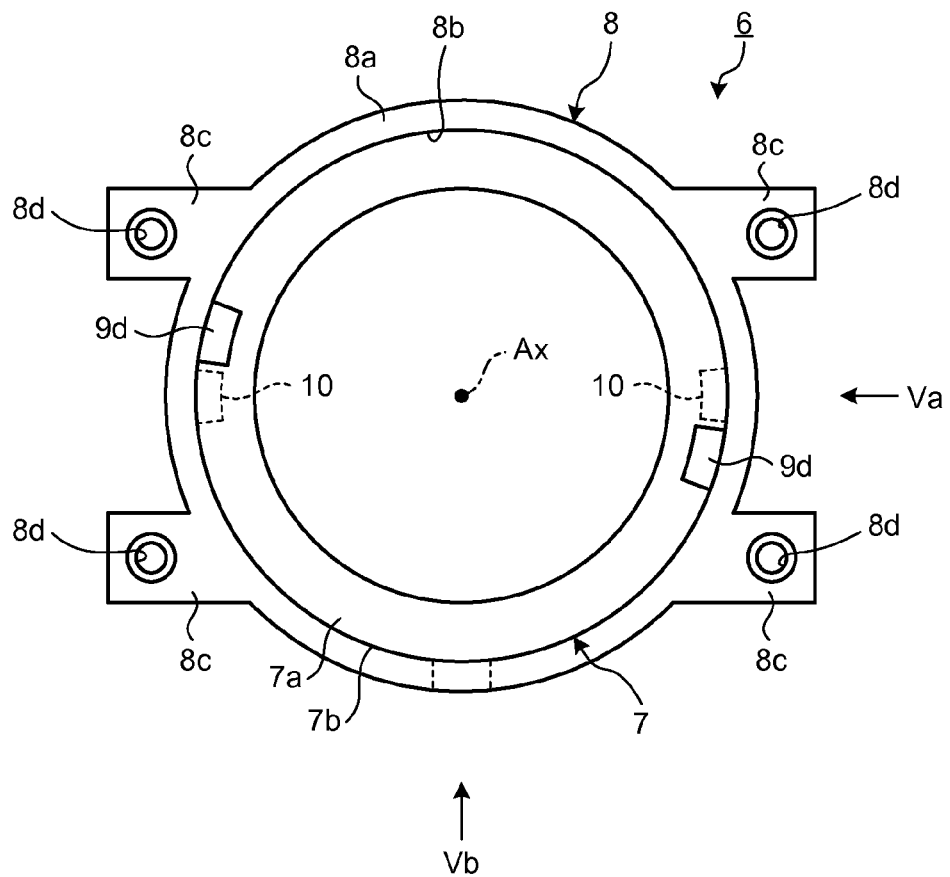
FIG. 11 is an exemplary plan view of the hinge mechanism viewed in the direction of a rotation axis in the embodiment.

As illustrated in FIGS. 9 and 10, the hinge mechanism 6 comprises a first member 7 and a second member 8. the first member 7 is fixed to the housing 2a of the first body 2, while the second member 8 is fixed to the housing 3a of the second body 3. A cylindrical portion 7a of the first member 7 and a cylindrical portion 8a of the second member 8 overlap each other in the radial direction. In the embodiment, the outer diameter of the cylindrical portion 7a is slightly smaller than the inner diameter of the cylindrical portion 8a. An outer circumference surface 7b of the cylindrical portion 7a faces an inner circumference surface 8b of the cylindrical portion 8a in contact therewith or slightly spaced therefrom. The cylindrical portions 7a and 8a relatively rotate (slide) about the rotation axis Ax as the center axis, and thereby the first body 2 and the second body 3 relatively rotate about the rotation axis Ax. The cylindrical portions 7a and 8a relatively move along the rotation axis Ax, and thereby the first body 2 and the second body 3 relatively move along the rotation axis Ax. Besides, the cylindrical portions 7a and 8a are provided with attachment portions 7c and 8c, respectively, on their outer circumference. The attachment portions 7c and 8c extend toward the outside in the radial direction. Attachment holes 7d and 8d are formed as through holes or cutouts in the attachment portions 7c and 8c, respectively. Attachment elements (not illustrated) such as screws are inserted into the attachment holes 7d and 8d and fixed to the housings 2a and 3a, respectively. Thus, the first member 7 and the second member 8 are attached to the corresponding housings 2a and 3a, respectively.

As illustrated in FIG. 10, a groove 9 is formed as a guide rail in either one of the first member 7 and the second member 8 (in the embodiment, in the first member 7). The groove 9 comprises a section (an incline portion 9b) extending spirally around the rotation axis Ax. A protrusion 10 is formed as a slider in the other one of the first member 7 and the second member 8 (in the embodiment, in the second member 8). The protrusion 10 is guided along the groove 9 as a guide rail. More specifically, the cylindrical portion 8a is provided on the inner circumference surface 8b with the protrusion 10 extending toward the inside in the radial direction of the rotation axis Ax. The groove 9 is formed in the outer circumference surface 7b of the cylindrical portion 7a to receives the protrusion 10.

In the embodiment, after the hinge mechanism 6 is assembled, the protrusion 10 moves only in a range along the groove 9. Thus, the path of the groove 9 as a guide rail restricts the relative rotation about the rotation axis Ax and the relative movement along the rotation axis Ax of the first member 7 and the second member 8, and also the relative rotation about the rotation axis Ax and the relative movement along the rotation axis Ax of the first body 2 and the second body 3.

When the electronic device 1 is assembled, the protrusion 10 is maintained fitted in the groove 9. Accordingly, the engagement of the protrusion 10 and the groove 9 prevents the first body 2 and the second body 3 from being separated in the direction of the rotation axis Ax.

The protrusion 10 is provided to two points that face each other with the rotation axis between them near an opening 8e on the opposite side of the base side where the attachment portions 8c are provided. In other words, the protrusions 10 are located around the rotation axis Ax at an angle difference of 180° (deg). The protrusion 10 may be formed into a rectangular parallelepiped with chamfered edges or a columnar shape, or may be provided as a roller that rotates in the groove 9.

Figure 6:
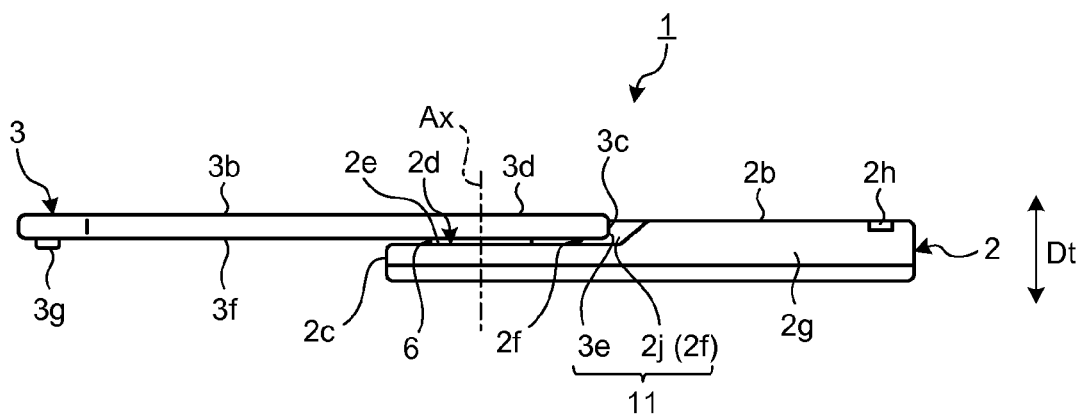
FIG. 6 is an exemplary side view of the electronic device illustrated in FIG. 2 in the embodiment.
Figure 7:
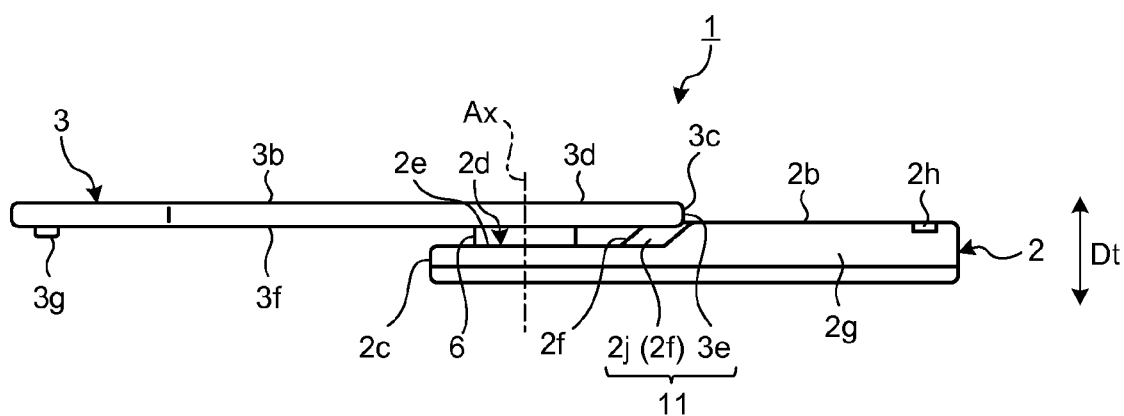
FIG. 7 is an exemplary side view of the electronic device illustrated in FIG. 3 in the embodiment.

The groove 9 comprises an arc portion 9a on the base side where the attachment portions 7c are provided. The arc portion 9a extends in the circumference direction along a plane perpendicular to the rotation axis Ax. The groove 9 further comprises the incline portion 9b extending spirally around the rotation axis Ax and a second arc portion 9c extending in the circumference direction in parallel with the arc portion 9a on the end side of the cylindrical portion 7a. The arc portion 9a corresponds to a section where the first body 2 and the second body 3 relatively rotate about the rotation axis Ax when the edge 3d of the second body 3 is fitted in the recess 2d of the first body 2 while the bottom surface 2e of the recess 2d is in contact with the back surface 3f of the second body 3 as illustrated in FIG. 5. The incline portion 9b corresponds to a section where the first body 2 and the second body 3 relatively move along the direction of the rotation axis Ax while relatively rotating about the rotation axis Ax, i.e., relatively move spirally, while an inclined surface 2j as part of the side surface 2f of the recess 2d of the first body 2 is in contact with the side surface 3e of the second body 3 (or a corner between the side surface 3e and the back surface 3f) as illustrated in FIGS. 6 and 7. The second arc portion 9c corresponds to a section where the first body 2 and the second body 3 relatively rotate about the rotation axis Ax while the front surface 2b of the first body 2 is in contact with the back surface 3f of the second body 3.

Figure 16:
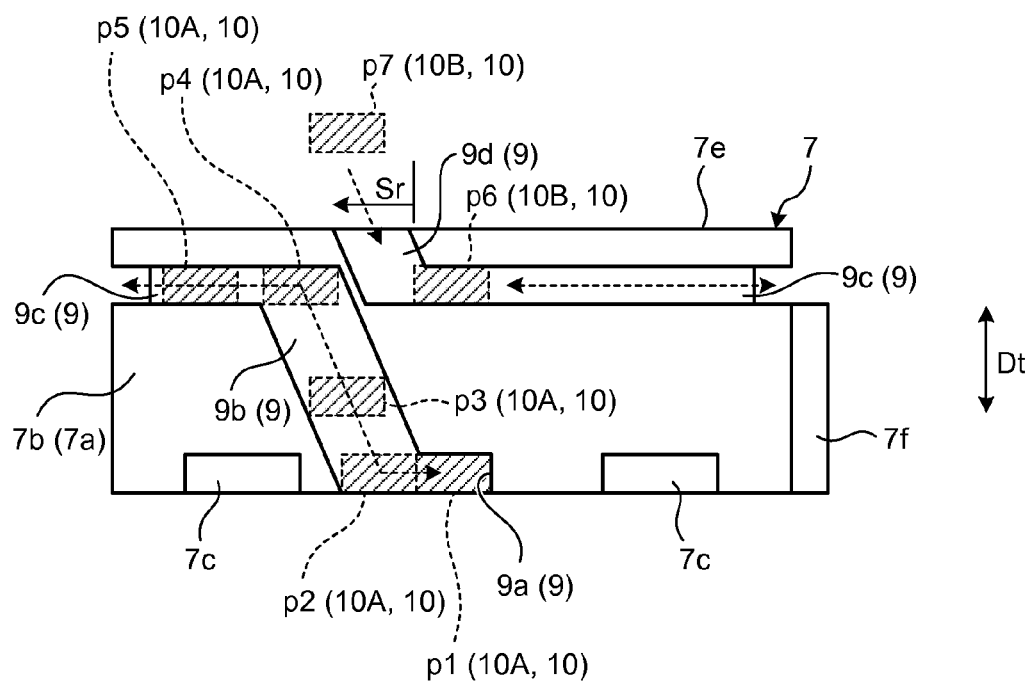
FIG. 16 is an exemplary side view of a first member of the hinge mechanism schematically illustrating sliding movement along a guide rail in the embodiment.

The grooves 9 are formed correspondingly to the two protrusions 10, respectively. As illustrated in FIGS. 10 and 16, a guide portion 9d is formed correspondingly to each of the grooves 9 to guide each of the protrusions 10 from a periphery 7e on the end side of the cylindrical portion 7a to the arc portion 9a. When the first body 2 and the second body 3 are assembled, the protrusion 10 is guided in the groove 9 through the guide portion 9d (p7 to p6 in FIG. 16). The protrusions 10 (10A and 10B) are located to face each other with the rotation axis Ax between them. Corresponding the location of the two protrusions 10, the guide portions 9d are provided to face each other with the rotation axis Ax between them. In the properly assembled electronic device 1, as described above, the engagement of the stoppers of the first body 2 and the second body 3 restricts the range in which the first body 2 and the second body 3 rotate about the rotation axis Ax, and thereby restricts the range in which the protrusion 10 moves in the groove 9. That is, by providing the guide portion 9d in a movement restriction section Sr where the movement of the protrusion 10 is restricted or a position partly overlapping the movement restriction section Sr, the protrusion 10 is prevented from coming off the groove 9 trough the guide portion 9d.

Figure 14:
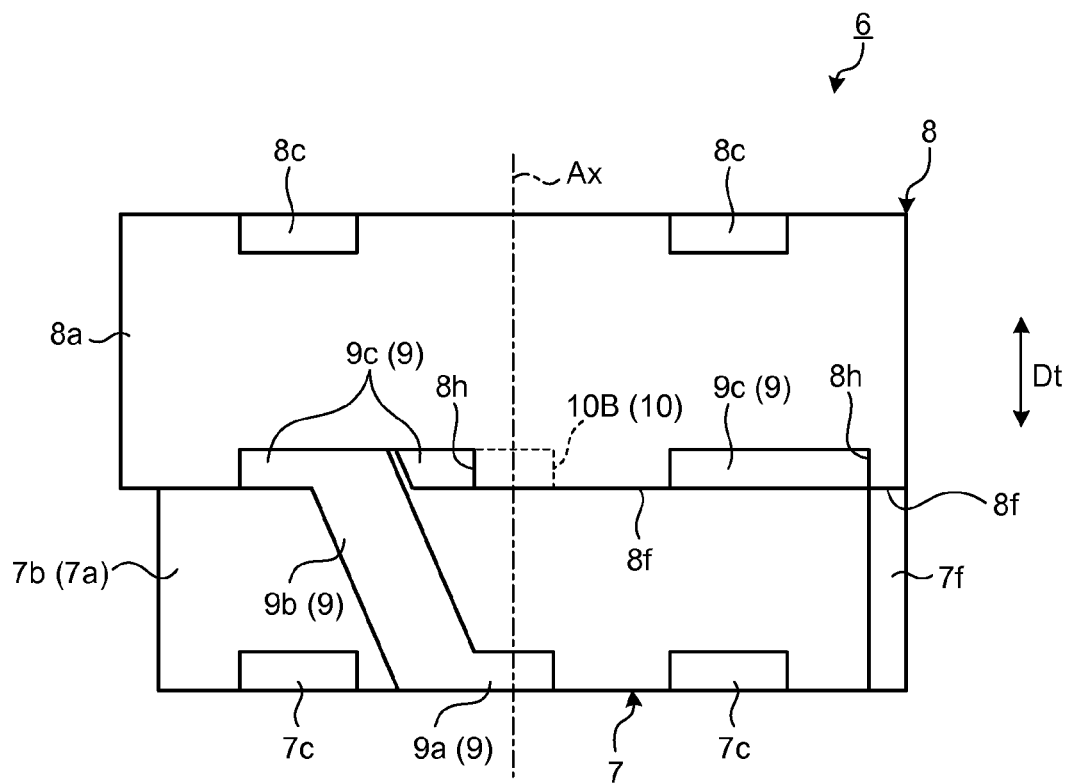
FIG. 14 is an exemplary side view of the hinge mechanism viewed in the direction Va of FIG. 11 when the electronic device is in the closed mode in the embodiment.
Figure 15:
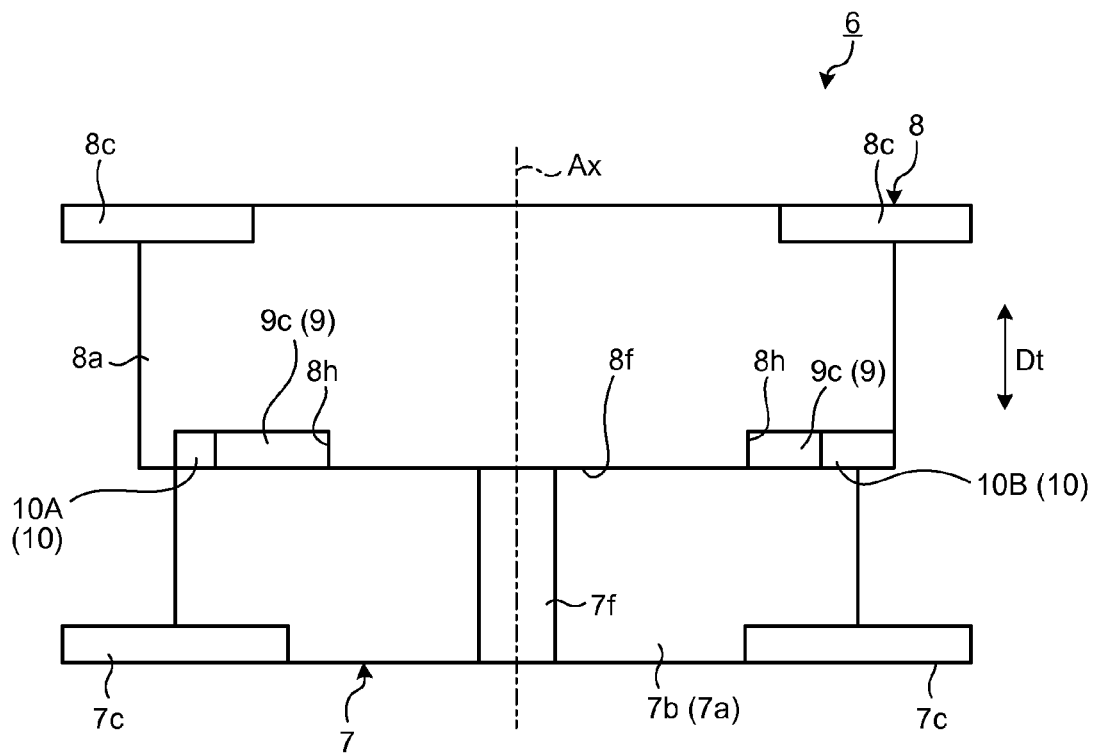
FIG. 15 is an exemplary side view of the hinge mechanism viewed in the direction Vb of FIG. 11 when the electronic device is in the closed mode in the embodiment.

The first member 7 comprises a restricting portion 7f that restricts the first member 7 and the second member 8 from contracting in a direction along the rotation axis Ax in the closed mode as illustrated in FIGS. 14 and 15, i.e., in the state where the first member 7 and the second member 8 extend in a direction along the rotation axis Ax (the thickness direction Dt). In the embodiment, as illustrated in FIG. 10, the restricting portion 7f is formed as a protrusion protruding in the radial direction of the rotation axis Ax and extending in a direction along the rotation axis Ax. The restricting portion 7f faces an end surface 8f of the second member 8 in contact therewith or slightly spaced therefrom. Thus, the restricting portion 7f restricts the first member 7 and the second member 8 from contracting in a direction along the rotation axis Ax (the thickness direction Dt), and thereby restricts the first body 2 and the second body 3 from relatively move along the rotation axis Ax accidentally. Further, at least in the closed mode, the restricting portion 7f reduces the load on the engagement portion of the protrusion 10 and the groove 9 caused by an external force acting between the first body 2 and the second body 3. As described above, according to the embodiment, the restricting portion 7f, which interferes with the second member 8 to thereby restrict the first member 7 and the second member 8 from contracting in a direction along the rotation axis Ax, can be relatively easily obtained as a protrusion formed on the outer circumference surface 7b of the cylindrical portion 7a.

Preferably, the restricting portion 7f is located in an area Ar between the rotation axis Ax and the sides (edges) 2c and 3c near the rotation axis Ax in the closed mode as illustrated in FIGS. 4 and 8. With this, as illustrated in FIG. 8, if an external force Facts from the side of sides 2i and 3i distant from the rotation axis Ax in the closed mode in the direction in which the first body 2 and the second body 3 separate from each other in the thickness direction Dt, the restricting portion 7f comes in contact with the end surface 8f of the second member 8 on the side opposite the sides 2i and 3i with respect to the rotation axis Ax, i.e., on the side of the sides 2c and 3c. The restricting portion 7f counteracts the external force F acting from the side distant from the hinge mechanism 6 of the first body 2 and the second body 3 in the closed mode and separating the first body 2 and the second body 3 in the thickness direction Dt. Thus, the restricting portion 7f constitutes an element to prevent the first body 2 and the second body 3 from accidentally separating in the thickness direction Dt.

Figure 13:
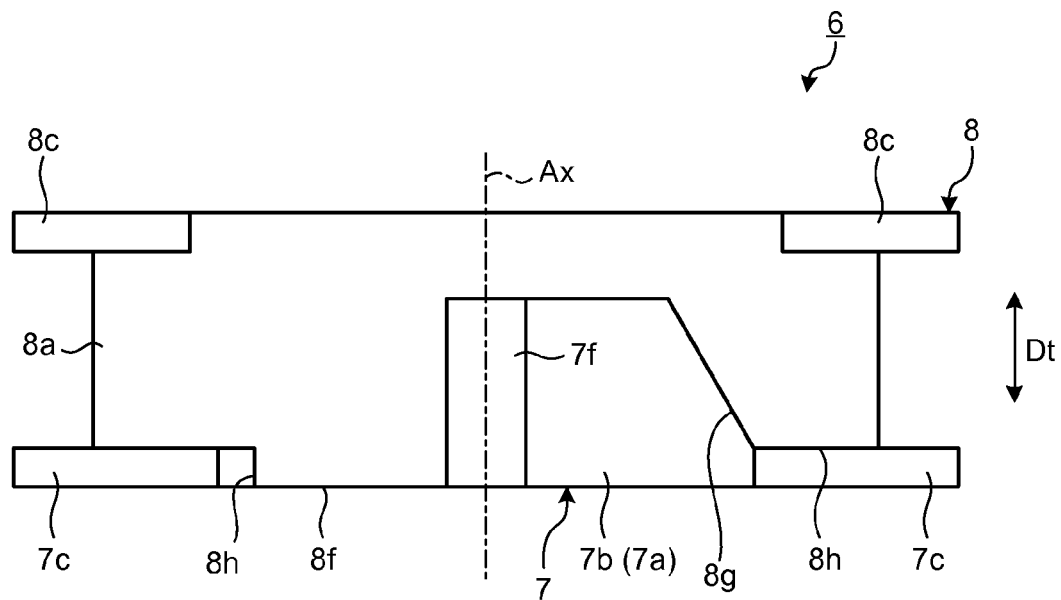
FIG. 13 is an exemplary side view of the hinge mechanism viewed in a direction Vb of FIG. 11 when the electronic device is in the open mode in the embodiment.

As illustrated in FIGS. 10 and 13, a notch 8g is formed on the end surface 8f of the second member 8 correspondingly to the position of the restricting portion 7f in the open mode. The notch 8g extends toward the attachment portion 8c. When the first member 7 and the second member 8 approach in a direction along the rotation axis Ax as the electronic device 1 transforms from the closed mode to the open mode, the restricting portion 7f enters into the notch 8g. That is, the notch 8g prevents the first member 7 and the second member 8 from being incapable of contracting in a direction along the rotation axis Ax due to interference between the restricting portion 7f and the cylindrical portion 8a.

Figure 12:
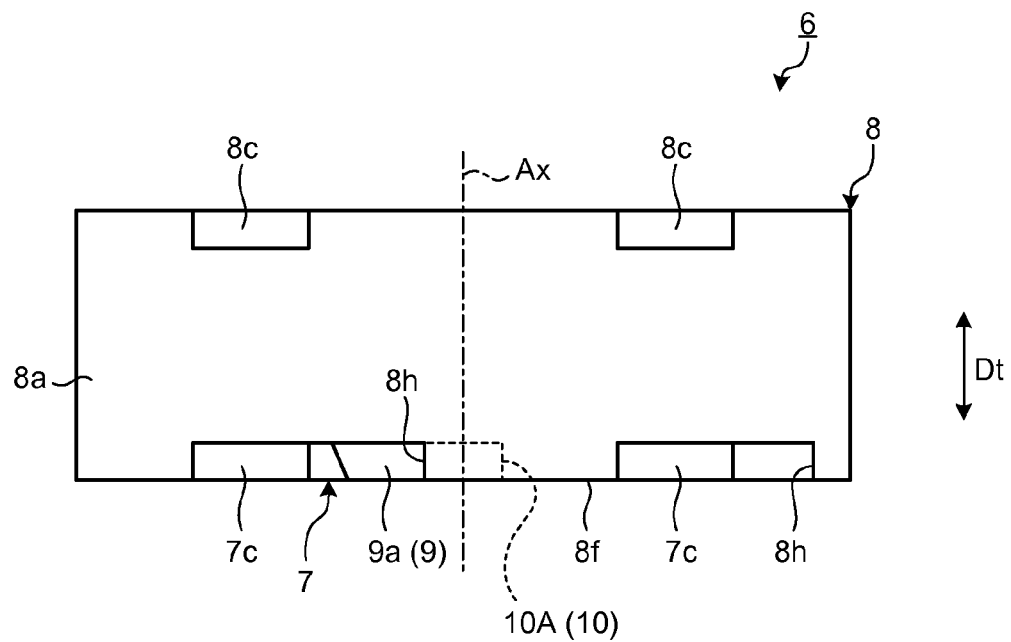
FIG. 12 is an exemplary side view of the hinge mechanism viewed in a direction Va of FIG. 11 when the electronic device is in the open mode in the embodiment.

Further, in the embodiment, a notch 8h is formed on the end surface 8f of the second member 8 to avoid interference with the attachment portion 7c of the first member 7. With this, as illustrated in FIGS. 12 and 13, the hinge mechanism 6 can be lowered in the thickness direction Dt in the open mode (i.e., in the sate where the first member 7 and the second member 8 are contracted along the rotation axis Ax). Thus, the hinge mechanism 6 can be downsized, which makes the electronic device 1 thinner.

The electronic device 1 is provided with a contact portion 11 where the housing 2a of the first body 2 is in contact with the housing 3a of the second body 3 while the protrusion 10 is moving along the incline portion 9b. The contact portion 11 guides the second body 3 so that the second body 3 moves spirally about the rotation axis Ax relative to the first body 2. In the embodiment, part of the side surface 2f of the recess 2d of the first body 2 and part of the side surface 3e of the second body 3 (or a corner between the side surface 3e and the back surface 3f) constitute the contact portion 11.

That is, form the open mode illustrated in FIG. 5 to the closed mode illustrated in FIG. 8, when the second body 3 is rotated about the rotation axis Ax with respect to the first body 2, as illustrated in FIGS. 6 and 7, the side surface 3e of the housing 3a of the second body 3 comes in contact with the inclined surface 2j of the housing 2a of the first body 2. In the embodiment, the inclined surface 2j is inclined with respect to the front surface 2b and the bottom surface 2e. Accordingly, the side surface 3e of the second body 3 moves from the bottom surface 2e side toward the front surface 2b while in contact with the inclined surface 2j. At this time, the first body 2 and the second body 3 relatively move along the direction of the rotation axis Ax while relatively rotating about the rotation axis Ax. Accordingly, the side surface 3e and the inclined surface 2j as contact surfaces move spirally about the rotation axis Ax.

In the embodiment, as illustrated in FIGS. 6 and 7, while the first body 2 and the second body 3 are relatively moving along the direction of the rotation axis Ax while relatively rotating about the rotation axis Ax, the first body 2 and the second body 3 are maintained in a parallel relationship by the hinge mechanism 6 and the contact portion 11 as two support points (contact points). Accordingly, for example, a range from a position where the second body 3 is rotated counterclockwise in FIGS. 1 to 4 from the open mode of FIG. 1 by a first angle (for example, 10° (deg)) with respect to the first body 2 to a position where the second body 3 is rotated by a second angle (for example, 30° (deg)) is set as the section where the first body 2 and the second body 3 relatively move along the direction of the rotation axis Ax while relatively rotating about the rotation axis Ax, i.e., relatively move spirally (hereinafter, "spiral movement section"). The start point and the end point of both the incline portion 9b and the side surface 3e are formed correspondingly to the spiral movement section.

In other words, if the user rotates the second body 3 counterclockwise in FIGS. 1 to 4 from the open mode of FIG. 1 with respect to the first body 2, when the second body 3 rotates by the first angle (in the state just before the state of FIGS. 2 and 6), the protrusion 10 enters into the incline portion 9b from the arc portion 9a (p2 in FIG. 16). At substantially the same time, the side surface 3e of the second body 3 comes in contact with the inclined surface 2j of the first body 2 (start of the spiral movement section).

If the user further rotates the second body 3 counterclockwise in FIGS. 1 to 4 (in the state between the states of FIGS. 2 and 3 and FIGS. 6 and 7), the protrusion 10 moves spirally while guided by the incline portion 9b (p3 in FIG. 16), and also the side surface 3e and the inclined surface 2j as contact surfaces move spirally (moving in the spiral movement section).

If the user further rotates the second body 3 counterclockwise in FIGS. 1 to 4, when the second body 3 rotates by the second angle (in the state just after the state of FIGS. 3 and 7), the protrusion 10 comes out of the incline portion 9b and enters into the second arc portion 9c (p4 in FIG. 16). At this point, the contact between the side surface 3e and the inclined surface 2j is released, and the second body 3 overlaps the first body 2 in the thickness direction Dt (end of the spiral movement section).

If the user further rotates the second body 3 counterclockwise in FIGS. 1 to 4, the first body 2 and the second body 3 relatively rotate about the rotation axis Ax into the closed mode (see FIGS. 4 and 8) while the front surface 2b of the first body 2 is in contact with the back surface 3f of the second body 3. In the closed mode, the protrusion 10 is located at p6 in FIG. 16 (FIG. 16 illustrates only the position P6 of the protrusion 10B). While the first body 2 and the second body 3 relatively rotate from the closed mode to the open mode, the protrusion 10 moves in a reverse order of that described above, i.e., p6, p5, p4, p3, p2 and p1.

To realize the contact between the side surface 3e and the inclined surface 2j, the inclined surface 2j is formed into a spiral shape corresponding to the rotation path of the side surface 3e about the rotation axis Ax and the movement path of the side surface 3e along the rotation axis Ax. Incidentally, the inclined surface 2j may be formed into an arcuate shape so that the contact surfaces move along the radial direction of the rotation axis Ax while the first body 2 and the second body 3 are relatively rotating.

As described above, according to the embodiment, the electronic device 1 is provided with the hinge mechanism 6 that connects the first body 2 and the second body 3 such that they can relatively rotate about the rotation axis Ax and also relatively move along the direction of the rotation axis Ax. The electronic device 1 is further provided with the contact portion 11 where the housing 2a of the first body 2 and the housing 3a of the second body 3 are in contact with each other while the first body 2 and the second body 3 are relatively rotating about the rotation axis Ax. The contact portion 11 guides one of the first body 2 and the second body 3 so that it moves spirally about the rotation axis Ax relative to the other one of the first body 2 and the second body 3. The hinge mechanism 6 and the contact portion 11 implement a simple structure that enables the first body 2 and the second body 3 to relatively rotate about the rotation axis Ax and relatively move along the direction of the rotation axis Ax.

If the first body 2 and the second body 3 relatively move along the direction of the rotation axis Ax while relatively rotating about the rotation axis Ax through only the hinge mechanism 6 without the contact portion 11, it is necessary to reinforce the support of the first body 2 and the second body 3 in the hinge mechanism 6. This may cause an increase in the size and weight of the hinge mechanism 6. Further, the load is increased in the direction perpendicular to the rotation axis Ax in the hinge mechanism 6, and accordingly, the hinge mechanism 6 is likely to be inclined. This is an obstacle to smooth relative rotation. In view of this, according to the embodiment, the first body 2 and the second body 3 are in contact with each other at tow points, i.e., the hinge mechanism 6 and the contact portion 11, when relatively moving along the direction of the rotation axis Ax while relatively rotating about the rotation axis Ax. Thus, the load caused by an external force can be distributed between the two points.

In the embodiment, the first body 2 and the second body 3 can relatively rotate about the rotation axis Ax at least between the open mode in which the projected area is larger viewed in a direction along the rotation axis Ax and the closed mode in which the projected area is smaller. In the closed mode, the second body 3 overlaps the first body 2 in the thickness direction Dt with the front surface 2b of the first body 2 facing the back surface 3f of the second body 3. When the first body 2 and the second body 3 relatively rotate from the closed mode to the open mode, the front surface 3b of the second body 3 approaches the front surface 2b of the first body 2 in the thickness direction Dt. Thus, it is possible to reduce the step between the front surface 2b of the first body 2 and the front surface 3b of the second body 3, and thereby to reduce uncomfortable feeling of the user.

In the embodiment, the recess 2d is formed in at least one of the first body 2 and the second body 3 (in the embodiment, the first body 2) that receives part of the other (in the embodiment, the edge 3d of the second body 3) in the open mode. Accordingly, at least part of the hinge mechanism 6 can be housed inside the housing 2a on the back side of the bottom surface 2e of the recess 2d. This effectively implements a structure that enables the first body 2 and the second body 3 to relatively rotate about the rotation axis Ax and relatively move along the direction of the rotation axis Ax. Moreover, since the bottom surface 2e of the recess 2d can be in contact with the back surface 3f of the edge 3d, the connection between the first body 2 and the second body 3 can be reinforced.

In the embodiment, part of the side surface 2f of the recess 2d is the inclined surface 2j that is formed as the contact portion 11 at the boundary between the bottom surface 2e of the recess 2d and the front surface 2b of the first body 2 or the back surface 3f of the second body 3. That is, the inclined surface 2j serving as the contact portion 11 can be easily formed using the side surface 2f of the recess 2d.

In the embodiment, the hinge mechanism 6 comprises the first member 7 fixed to the first body 2 and the second member 8 fixed to the second body 3. The groove 9 is formed as a guide rail in the first member 7. The groove 9 comprises the incline portion 9b extending spirally around the rotation axis Ax. The protrusion 10 is formed as a slider in the second member 8. The protrusion 10 is guided along at least the incline portion 9b of the groove 9. Thus, the hinge mechanism 6 can be relatively simply structured with the groove 9 and the protrusion 10.

In the embodiment, the first member 7 and the second member 8 comprise the cylindrical portions 7a and 8a, respectively, that overlap each other in the radial direction. This increases the rigidity of the hinge mechanism 6 and also widens the contact area between the first member 7 and the second member 8, thereby reducing the pressure on the contact surfaces. Thus, it is possible to reduce undesirable events such as wear and deformation of the hinge mechanism 6, and increase the durability of the hinge mechanism 6.

In the embodiment, the groove 9 as a guide rail is formed in the outer circumference surface 7b of the cylindrical portion 7a of the first member 7. Meanwhile, the protrusion 10 as a slider is formed on the inner circumference surface 8b of the cylindrical portion 8a of the second member 8. Thus, a guide rail and a slider can be relatively simply structured. Moreover, the groove 9 can be formed easier than in the case where a groove is formed in the inner circumference surface 8b.

In the embodiment, in addition to the groove 9 as a guide rail and the protrusion 10 as a slider, the hinge mechanism 6 comprises the restricting portion 7f that restricts the first member 7 and the second member 8 from contracting in the thickness direction Dt in the closed mode. The restricting portion 7f restricts the first body 2 and the second body 3 from relatively move in the thickness direction Dt accidentally. Further, since the load caused by an external force is distributed also to the restricting portion 7f, the load on the groove 9 and the protrusion 10 can be reduced, which increases the durability of the groove 9 and the protrusion 10.

In the embodiment, the restricting portion 7f is located between the rotation axis Ax and the sides 2c or 3c near the rotation axis Ax (in the area Ar in FIGS. 4 and 8) in a plan view in the closed mode. The restricting portion 7f counteracts an external force acting from the side distant from the hinge mechanism 6 of the first body 2 and the second body 3 in the closed mode and separating the first body 2 and the second body 3 in the thickness direction Dt. Thus, it is possible to prevent the first body 2 and the second body 3 from accidentally separating in the thickness direction Dt.

In the embodiment, the notch 8g is formed on the cylindrical portion 8a of the second member 8 to avoid interference with the second protrusion (projection) as the restricting portion 7f in the open mode. Thus, the restricting portion 7f can be relatively simply structured. Moreover, the notch 8g prevents the first member 7 and the second member 8 from being incapable of contracting in a direction along the rotation axis Ax, i.e., being incapable of transforming into the open mode, due to interference between the first member 7 and the second member 8 via the restricting portion 7f.

The above embodiment is susceptible to various modifications and alternative forms. For example, regarding the hinge mechanism, a different number of claws may be arranged at different places. Besides, the groove may be formed into a different shape. Further, the number, shape, arrangement, and the like of the restricting portion may be modified. Still further, the slider may be formed on the first member, and the guide rail may be formed in the second member. The first member may comprise the inner cylindrical portion, and the second member may comprise the outer cylindrical portion. Still Further, in the state where the first member and the second member are restricted from relatively moving to one side in the direction of the rotation axis by another member such as a biasing member (for example, a coil spring), the guide rail may be formed as an edge on the other side in the axial direction of the cylindrical portion. The hinge mechanism may be covered with a cover made of a flexible material or the like. Still Further, the recess may be formed in the second body.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a first housing;
   a second housing;
   a hinge mechanism configured to rotatably connect the first housing and the second housing with respect to each other, and to support the first housing and the second housing so that the first housing and the second housing can relatively move with respect to each other in a direction along the rotation axis; and
   a contact portion provided at a position different from a position where the hinge mechanism is provided, and comprising: an inclined surface provided to one of the first housing and the second housing and a surface provided to other one of the first housing and the second housing, and configured to be in contact with the inclined surface when the first housing and the second housing rotates with respect to each other about the rotation axis.

2. The electronic device of claim 1, wherein
   the first housing and the second housing are configured to relatively rotate with respect to each other about the rotation axis between an open mode in which a projected area as viewed in the direction along the rotation axis is larger and a closed mode in which the projected area is smaller,
   in the closed mode, the first housing and the second housing are configured to overlap each other in the direction along the rotation axis, and a surface of the second housing is configured to approach a surface of the first housing in the direction along the rotation axis, when the first housing and the second housing relatively rotate with respect to each other from the closed mode toward the open mode.

3. The electronic device of claim 2, further comprising a recess in at least one of the first housing and the second housing, the recess receiving a portion of other one of the first body and the second body in the open mode.

4. The electronic device of claim 3, wherein the inclined surface is provided at a boundary between a surface of the one of the first housing and the second housing to which the inclined surface is provided and a bottom surface of the recess provided to the one of the first housing and the second housing.

5. The electronic device of claim 2, wherein
the hinge mechanism comprises:
a first member fixed to the first housing; and
a second member fixed to the second housing,
at least one of the first housing and the second housing comprises a guide rail comprising an incline portion extending spirally around the rotation axis, and
other one of the first housing and the second housing comprises a slider configured to be guided along at least the incline portion of the guide rail.

6. The electronic device of claim 5, wherein the first member and the second member are provided with cylindrical portions, respectively, the cylindrical portions being configured to overlap each other in a radial direction of the rotation axis.

7. The electronic device of claim 6, wherein
the guide rail is a groove in an outer circumference surface of an inner one of the cylindrical portions, and
a protrusion configured to be fitted in the groove as the slider is formed on an inner circumference surface of an outer one of the cylindrical portions.

8. The electronic device of claim 5, wherein the hinge mechanism further comprises, other than the guide rail and the slider, a restricting portion configured to restrict the first member and the second member from contracting in the direction along the rotation axis in the closed mode.

9. The electronic device of claim 8, wherein the restricting portion is provided between the rotation axis and a side of the first housing or a side of the second housing near the rotation axis in a plan view in the closed mode.

* * * * *